(12) United States Patent
Meitav et al.

(10) Patent No.: US 6,790,556 B1
(45) Date of Patent: Sep. 14, 2004

(54) ELECTROCHEMICAL ENERGY STORAGE DEVICE HAVING IMPROVED ENCLOSURE ARRANGEMENT

(75) Inventors: Arieh Meitav, Rishon le-Zion (IL); Joel Lang, Givatayim (IL); Niles Fleischer, Rehovot (IL); David Lifschitz, Jerusalem (IL); Eugene Pecherer, Netanya (IL); Eli Rosh Chodesh, Rishon le Zion (IL); Joost Manassen, Rehovot (IL); Bharat Rawal, Surfside Beach, SC (US)

(73) Assignee: E.C.R. - Electro Chemical Research, Ltd. (IL)

( * ) Notice: Subject to any disclaimer, the term of this patent is extended or adjusted under 35 U.S.C. 154(b) by 115 days.

(21) Appl. No.: 09/723,353

(22) Filed: Nov. 27, 2000

Related U.S. Application Data

(60) Provisional application No. 60/168,761, filed on Dec. 6, 1999.

(51) Int. Cl.7 .......................... H01M 6/48; H01M 2/02; H01G 9/00
(52) U.S. Cl. ...................... 429/210; 429/153; 429/160; 429/163; 429/176; 29/623.1; 29/25.03; 361/502
(58) Field of Search ................................ 429/210, 163, 429/153, 160, 176; 29/623.1, 25.03; 361/502

(56) References Cited

U.S. PATENT DOCUMENTS

| | | | |
|---|---|---|---|
| 4,488,203 A | 12/1984 | Muranaka et al. | |
| 5,136,474 A | 8/1992 | Sarangapani et al. | |
| 5,374,490 A | * 12/1994 | Aldecoa | 429/210 X |
| 5,382,481 A | 1/1995 | Fleischer | |
| 5,512,391 A | 4/1996 | Fleischer | |
| 5,550,706 A | 8/1996 | Kurzweil et al. | |
| 5,556,627 A | * 9/1996 | LaFollette | 429/210 |
| 5,580,681 A | 12/1996 | Fleischer | |
| 5,585,209 A | 12/1996 | Feldstein | |
| 5,591,540 A | 1/1997 | Louie et al. | |
| 5,626,729 A | 5/1997 | Thompson et al. | |
| 5,646,815 A | 7/1997 | Owens et al. | |
| 5,728,485 A | 3/1998 | Watanabe et al. | |
| 5,728,489 A | 3/1998 | Gao et al. | |
| 5,729,424 A | 3/1998 | Sharp et al. | |
| 5,729,427 A | 3/1998 | Li et al. | |
| 5,729,428 A | 3/1998 | Sakata et al. | |
| 5,730,761 A | 3/1998 | Lake et al. | |
| 5,731,104 A | 3/1998 | Ventura et al. | |
| 5,731,105 A | 3/1998 | Fleischer et al. | |
| 5,733,683 A | 3/1998 | Searson et al. | |
| 5,736,275 A | * 4/1998 | Kaun | 429/210 X |
| 5,751,541 A | 5/1998 | Li et al. | |
| 5,807,412 A | 9/1998 | Li et al. | |
| 5,847,920 A | 12/1998 | Li et al. | |
| 5,849,025 A | 12/1998 | Owens et al. | |
| 5,916,709 A | 6/1999 | Arias et al. | |
| 5,948,562 A | 9/1999 | Fulcher et al. | |
| 5,986,878 A | 11/1999 | Li et al. | |
| 6,225,009 B1 | 5/2001 | Fleischer et al. | |

FOREIGN PATENT DOCUMENTS

| | | |
|---|---|---|
| JP | 4348016 A | 12/1992 |
| WO | WO 9813887 | 4/1998 |

OTHER PUBLICATIONS

PCT Search Report May 23, 2001.
Medical Plastics and Biomaterials—The Role of Conductive Films in Fabricating Precision Components for Medical Electronic Devices Jul. 1999.

* cited by examiner

Primary Examiner—John S. Maples
(74) Attorney, Agent, or Firm—Dority & Manning, P.A.

(57) ABSTRACT

An improved electrochemical single or multi-cell energy storage device and casing are provided. The casing may be a pair of U-shaped shells, a single foil piece or even a tube-shaped structure which encases the internal electrochemical cell stack. The energy storage device and casing advantageously exhibit low internal resistance, low ESR, a high voltage/capacity, and a low contact resistance between the internal stack and the outer casing.

36 Claims, 8 Drawing Sheets

| CAPACITOR TYPE | | CAP. (mF) | VOLTAGE (V) | DIMEN. (mm) | ERS (mΩ) | CV/c.c. (mFV/c.c.) |
|---|---|---|---|---|---|---|
| TANTALUM | | 0.47 | 6.3 | 6.0x7.0x3.5 | 100 | 20 |
| | | 1.0 | 4.0 | 6.0x7.0x3.6 | 30 | 26 |
| ELECTROLYTIC ALUMINUM SOLID CAPACITOR ORGANIC SEMI-CONDUCTIVE ELECTROLYTE | | 1.5 | 4.0 | φ10xL20 | 15 | 3.2 |
| | | 2.2 | 4.0 | φ12.5xL22 | 10 | 3.3 |
| | | 2.2 | 6.3 | φ16xL25 | 15 | 2.8 |
| ELECTROLYTIC CAPACITOR | | 4.7 | 6.3 | φ16xL26 | 100 | 6 |
| | | 15 | 6.3 | φ16xL35.5 | 30 | 13 |
| | | 22 | 6.3 | φ18xL41 | 20 | 13 |
| | | 15 | 10 | φ18xL35.5 | 30 | 17 |
| | | 330 | 10 | φ76xL114 | 10 | 6 |
| BEST CAP™ | | 250 | 8.0 | 52x50x4.4 | 50 | 150 |
| | | 250 | 5.5 | 48x30x3.2 | 60 | 300 |
| | | 500 | 5.5 | 48x30x5.6 | 30 | 350 |
| | | 600 | 4.5 | 48x30x5.0 | 25 | 380 |
| | | 700 | 3.5 | 48x30x4.5 | 20 | 400 |
| | | 60 | 5.5 | 28x17x3.2 | 200 | 210 |
| | | 120 | 5.5 | 28x17x5.5 | 100 | 250 |

*FIG. 7*

| FEATURE/MODEL # | 5.5/48x30-1 | 5.5/48x30-2 | 4.5/48x30-2 | 3.5/48x30-2 | 5.5/28x17-2 | 5.5/28x17-1 | 3.5/28x17-2 | 3.5/28x17-1 |
|---|---|---|---|---|---|---|---|---|
| NOMINAL VOLTAGE (V) | 5.5 | 5.5 | 4.5 | 3.5 | 5.5 | 5.5 | 3.5 | 3.5 |
| CAPACITANCE(1) (mF) | 250 | 500 | 600 | 700 | 60 | 120 | 200 | 60 |
| ESR(2) (mΩ) | 60 | 30 | 25 | 20 | 200 | 100 | 70 | 100 |
| L.C.(3) (μA) | <10 | <20 | <10 | <10 | <2 | <4 | <2 | <2 |
| CYCLE-LIFE(4) (#) | <$10^7$ | | | | | | | |
| DIMENSIONS (mm) L x W | 48x30 | | | | 28x17 | | | |
| H | 3.2 | 5.6 | 5.0 | 4.5 | 3.2 | 5.5 | 4.0 | 1.8 |
| TEMPERATURE (°C) | -20°C—+60°C | | | | | | | |

FIG. 8

ELECTROCHEMICAL ENERGY STORAGE DEVICE HAVING IMPROVED ENCLOSURE ARRANGEMENT

REFERENCE TO RELATED APPLICATIONS

This application claims priority to Provisional Patent Application USSN 60/168,761, entitled "Novel Enclosures for Electrochemical Capacitors and Batteries" filed Dec. 6, 1999, which is fully incorporated herein by reference.

BACKGROUND OF THE INVENTION

This invention generally relates to electrochemical systems for storage and release of electrical energy. In particular, the present invention relates to electrochemical systems for use in electronic circuits, for example, as capacitors or batteries. More particularly, the present invention relates to electrochemical systems for operation in electronic circuitry, for example, as capacitors or batteries, with either a non-liquid, organic solution, aqueous solution or a protonic medium electrolyte material positioned between the electrodes.

Further still, the present invention relates to improved designs for bi-polar assemblies that address the deficiencies in existing bi-polar designs. In particular, this invention relates to an assembly of a plurality of single cells of an electrochemical system.

As electronic devices and other electrical apparatuses become increasingly more portable and provide more functionality, advances must be made in the devices of such devices that enable such portability. As is often the case with current electronics technology, the limiting factor in both size and functionality of an electronic apparatus is the size and weight of its component parts. In particular, the size and weight of its energy storage components. Additionally, the miniaturization of electronics has seen the push towards integrating various components into a single device to save both room and weight within both portable and stationary devices.

The current main energy source used for portable electronics is the electrochemical battery and/or the electrochemical capacitor. One of the limiting features of such current energy storage devices is the packaging of the electrochemical system. Prior art enclosures for flat and low height designs have suffered from several disadvantages. Coin cells for round shaped assemblies have needed to be crimped or swagged closed which requires expensive precision tooling. Further, such a method of enclosure requires accurate placement and/or control of closing pressures which can be very time consuming. Prismatic cell designs for rectangular and square shaped assemblies require precise corner radii and equivalent closing force across the entire area of the design to ensure good contact between the casing and the internal cells. While useful for their purpose, these prior art designs have forced higher production costs and longer production times due to the precision and technically complex assembly methods.

Further, in both coin and prismatic designs a grommet is needed to prevent shorting between the two poles of the electrochemical system. Should the electrochemical device consist of a plurality of cells in a stack then the grommet must serve to insulate the edge of the pack from the enclosure and insulate the two portions of the enclosure that contact the two poles of the device. Thus the grommet acts to prevent the manufacture of some desirable forms of connections to a plurality of cells.

It is, therefore, desirable to provide a multi-cell energy storage device which may comprise either an electrochemical capacitor, a double-layer capacitor or a battery. In an electrochemical capacitor version of the present invention, which may also be referred to as a pseudo-capacitor or batcap, the electrodes comprise material that may participate in reversible charge transfer reactions. Thus, a portion of the energy is stored in the double-layer at the surface of the electrodes and another portion is contributed by the charge transfer reactions. In a double-layer capacitor version of the present invention, essentially all of the energy is stored in the double layer at the surface of the electrodes. In a battery version of the present invention, the anode and cathode materials are specifically chosen so that each reacts during operation of the cell. The chemical energy that is stored in the electrodes is converted to electrical energy via charge transfer reactions of active materials. It is also desirable to provide a new packaging for an electrochemical single or multi-cell energy storage device wherein the cells in a multi-cell design may be in series, parallel or a combination thereof by virtue of the device's construction in one integrated structure.

SUMMARY OF THE INVENTION

The present invention recognizes and addresses various of the foregoing limitations and drawbacks, and others, concerning both the design of an electrochemical single or multi-cell energy storage device and methods of packaging the same. Therefore, the present invention provides an improved electrochemical single or multi-cell energy storage device and outer packaging for the same.

It is, therefor, a principle object of the subject invention to provide an improved electrochemical single or multi-cell energy storage device. More particularly, it is an object of the present invention to provide an electrochemical single or multi-cell energy storage device within an improved casing. In such context, it is still a more particular object of the present invention to provide an electrochemical single or multi-cell energy storage device wherein the improved casing comprises a pre-formed metal sheet.

Still further, it is a principle object of this invention to provide an improved single layer, electrically conductive casing for an electrochemical single or multi-cell energy storage device. It is a further object of the present invention to provide such an improved electrochemical single or multi-cell energy storage device and casing which are simple and cost-effective to manufacture. In such context, it is an object of the present invention to provide a electrochemical single or multi-cell energy storage device and improved casing which exhibits a low equivalent series resistance (hereinafter ESR) and a low internal and contact resistance within the internal stack of the device and between the internal stack and the casing, respectively.

Additional objects and advantages of the invention are set forth in, or will be apparent to those of ordinary skill in the art from, the detailed description as follows. Also, it should be further appreciated that modifications and variations to the specifically illustrated and discussed features and materials hereof may be practiced in various embodiments and uses of this invention without departing from the spirit and scope thereof, by virtue of present reference thereto. Such variations may include, but are not limited to, substitutions of the equivalent means, features, and materials for those shown or discussed, and the functional or positional reversal of various parts, features, or the like.

Still further, it is to be understood that different embodiments, as well as different presently preferred embodiments, of this invention, may include various combinations or configurations of presently disclosed features, elements, or their equivalents (including combinations of features or configurations thereof not expressly shown in the figures or stated in the detailed description).

These and other features, aspects and advantages of the present invention will become better understood with reference to the following description and appended claims. The accompanying drawings, which are incorporated in and constitute a part of this specification, illustrate an embodiment of the invention and, together with the description, serve to explain the principles of the invention.

In one exemplary embodiment, there may be provided a multi-cell capacitor which comprises a carbon/plastic composite film coated with a metallic film on its external side as a terminal current collector, a plurality of non-conductive pre-formed isolating frames and within the openings formed in each of the perforated isolating frames is present a high surface area carbon-based electrode to form capacitive electrode plates.

A bi-polar assembly, for use internal to stack of series bi-polar connected cells, comprises a bi-polar current collector, such as a single conductive carbon polymer matrix current collector. The bi-polar current collector within each bi-polar assembly need not have a metal film coating. On respective top and bottom sides of each bi-polar current collector in the recesses formed within perforated isolating frames may be placed a high surface area carbon-based electrode paste to form electrode plates.

The capacitor device may be formed by stacking successive layers of a bi-polar current collector and electrodes, the electrodes being separated by proton conductive polymer membranes. The ends of the stacks are terminated with a terminal current collector. The membranes function as a proton conductive layer within each capacitor cell. The stack may be potted, along its periphery only, with an insulating material, such as but not limited to an epoxy, in order to maintain a good seal and prevent ingress of moisture from the ambient environment. An outer conductive casing, such as a pre-formed metal sheet, serves as a shell around the periphery potting material and is in physical contact with the terminal current collectors.

In such a multi-cell electrochemical energy storage device, closure may be made without the use of a grommet and there exists no need for crimping or swagging. The internal cells may be connected in a bi-polar design in series in order to increase the pack voltage. Alternatively, a tongue design may be used to combine two or more bi-polar stacks in parallel within a single casing in order to increase capacity and decrease internal resistance. The outer casing serves as a common pole for each of the stacks and the tongue as a common pole of the opposite polarity.

The casing may be a pair of U-shaped shells fitted over the epoxy-held internal stack or stacks and bonded along the adjoining sides of the shells. In an alternative exemplary embodiment, the casing may be a single sheet of pre-formed metal sheet bent approximate its midpoint to encase the epoxy-held internal stack and bonded along the adjoining ends of the foil sheet. In yet another exemplary embodiment, the casing may be a tube-shape. In any exemplary embodiment, the outer casing may be bent to form a pre-loaded structure that applies a spring-like loading to the shell in order to improve the contact between the shell and the stack and to offset thermal expansion cycles.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 is a table comparing conventional capacitor technology performance characteristics against those of a device made in accord with the present invention; and FIG. 8 is a table comparing performance characteristics of various electrochemical devices made in accord with the present invention.

Figure 1:
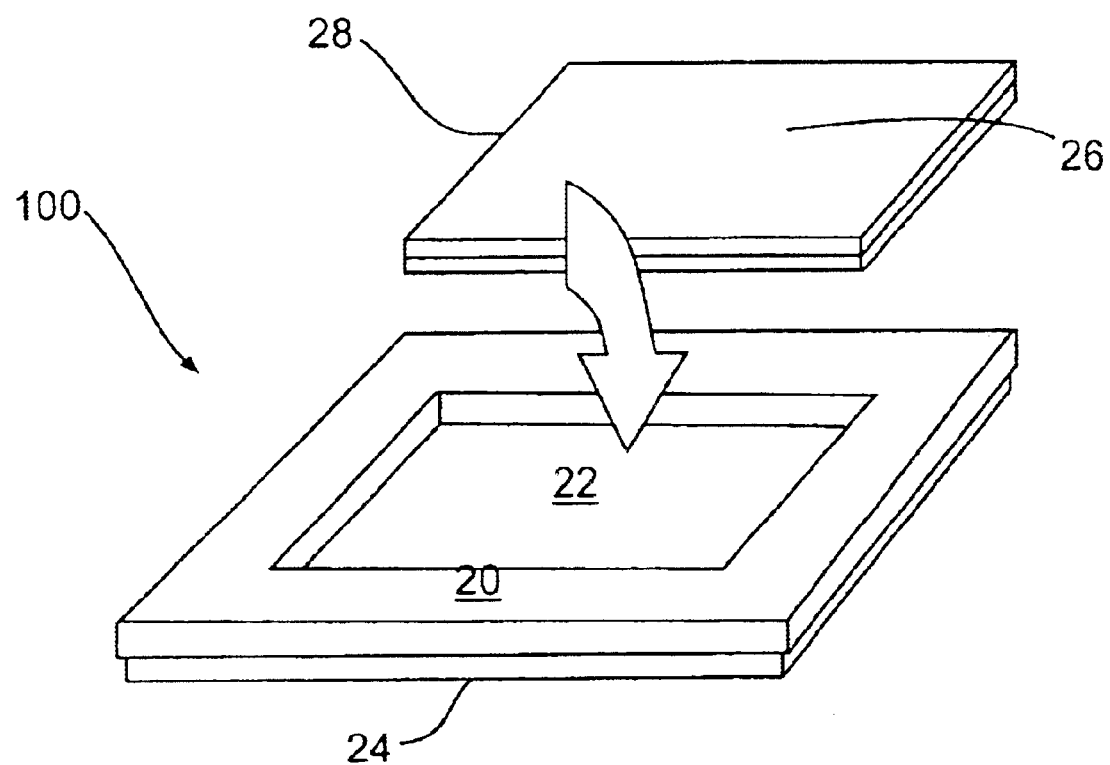
FIG. 1 is an exploded isometric view of the formation of the electrode plate in a perforated isolating frame with an affixed terminal current collector.

Repeat use of reference characters throughout the present specification and appended drawings is intended to represent the same or analogous features or elements of the invention.

DETAILED DESCRIPTION OF THE PREFERRED EMBODIMENTS

Reference will now be made in detail to presently preferred embodiments of the invention, examples of which are fully represented in the accompanying drawings. Such examples are provided by way of an explanation of the invention, not limitation thereof. In fact, it will be apparent to those skilled in the art that various modifications and variations can be made in the present invention, without departing from the spirit and scope thereof. For instance, features illustrated or described as part of one embodiment can be used on another embodiment to yield a still further embodiment. Still further, variations in selection of materials and/or characteristics may be practiced, to satisfy particular desired user criteria. Thus, it is intended that the present invention cover such modifications and variations as come within the scope of the present features and their equivalents.

As disclosed above, the present invention is particularly concerned with an improved electrochemical single or multi-cell energy storage device wherein the cells are in series or parallel by virtue of the device's construction and an improved packaging therefore. The present invention is applicable to the generation of double-layer capacitors, pseudo-capacitors, and/or batteries, as well as, combinations thereof fabricated together or individually in a given assembly. For the sake of brevity, commonly-owned and assigned application entitled "ULTRA-THIN ELECTROCHEMICAL STORAGE DEVICES," filed on Nov. 21, 2000 and provided with a serial number U.S. Ser. No. 09/717,940, which claims priority to a common provisional application is hereby incorporated fully by reference for all purposes.

In accord with the present invention, it is possible to fabricate such an electrochemical system with a low internal resistance by placing individual cells or bi-polar stacks in a common perforated isolating frame and connecting them with a series connection current collector that is not bi-polar. Within the system, the present invention provides greater versatility in achieving inter-cell or inter-subassembly connections in series, parallel or a combination thereof. Further, such systems may advantageously demonstrate a high voltage/capacitance value while maintaining a correspondingly low ESR and internal resistance.

FIG. 1 depicts a non-conductive perforated isolating frame 20. Such a frame 20 forms a cavity for the electrode. The frame 20 allows for a bi-polar stack or single cell subassemblies to be generated. The frame 20 may be generally rectangular or other shapes.

Additionally depicted in FIG. 1 is a current collector 24. The outer casing of the present invention functions as the current collector/external terminal of the device. Due to the planar geometry of the present invention the bi-polar electrical connections between cells and subassemblies require very good transverse conductivity. Additionally, the electrical connections need to be pressure insensitive. Conductive polymers and polymer composites have good transverse conductivity but poor lateral conductivity.

In one preferred embodiment, therefor, the current collector consist of two layers. The first layer is a conductive carbon layer which is in contact with the cell electrode. The second layer is a metal which is positioned between the first layer and the casing. A metal, metal alloy or metallic film displaying high conductivity and low contact resistance is preferred in order to increase the lateral conductivity of the current collector 24. Unfortunately, many metals that exhibit high lateral conductivity and low cost are not stable in the presence of the electrolytes commonly used in double-layer capacitors, pseudo-capacitors, and batteries. As a result, the preferred embodiment of the current collector 24 has a composite second layer comprising a conductive material which is stable when in proximity with such electrolytes and a metal or metallic film.

One exemplary such conductive material is a polymer film or a carbon/plastic composite film. The metal or metal alloy may be, but are not limited to, nickel, chromium, lead, tin, silver, titanium, brass, gold and/or copper. Either of the two materials of the preferred composite second layer may act as the base of the composite layer. The polymeric material may be deposited onto the metal base layer using, but not limited to, any of the following methods: screen printing, brush painting, propellant spraying/air brushing, or casting. Alternatively, the metal may be deposited onto the polymeric substrate base layer using, but not limited to, any of the following methods: vacuum deposition, flame spray coating, molten bath dipping, heat lamination, electroless deposition, electroplating, plasma deposition, sputtering, or propellant spray/air brushing in a carrier.

Alternatively, the current collector 24 may comprise any number of layers. The combination of layers and materials may be adjusted to achieve a desired combination of features including stability, lateral conductivity, interfacial contact resistance with the electrode, pressure insensitivity, solderability, creep, passivation, contact resistance, and permeability to the electrolyte, as well as, achieving the desired performance characteristics of the overall energy storage device. In openings 22 within the common perforated isolating frames 20 may be placed a high surface area carbon-based paste 26. Such a paste 26 may work to form electrode plates 28. As shown in FIG. 1, showing one such assembly 100, placing such a paste 26 within the openings 22 of the perforated isolating frame 20 may result in the formation of electrode plates 28. The paste is preferably a combination of a carbon material mixed with an aqueous sulfuric acid. The sulfuric acid concentration may range from 1–8 molar and the carbon content of the electrode may range from 8 to 36 weight per cent. Preferably the electrode thickness ranges from 30 to 300 microns.

In one exemplary embodiment of the electrochemical energy storage device, the electrodes comprise a high surface area carbon and a protonic medium. The protonic medium may be a material such as, but not limited to, water, aqueous acid solutions, sulfonic acids, poly-sulfonic acids such as polyvinyl sulfonic acid, protonic acids, compounds with one or more alcoholic hydroxyl groups, compounds with one or more carboxylic acid groups, compounds with one or more of the following groups: sulfonimides, —PO2H2, —CH2PO3H2, —OSO3H, —OPO2H2, —OPO3H2, —OArSO3H), and combinations thereof.

Figure 2:
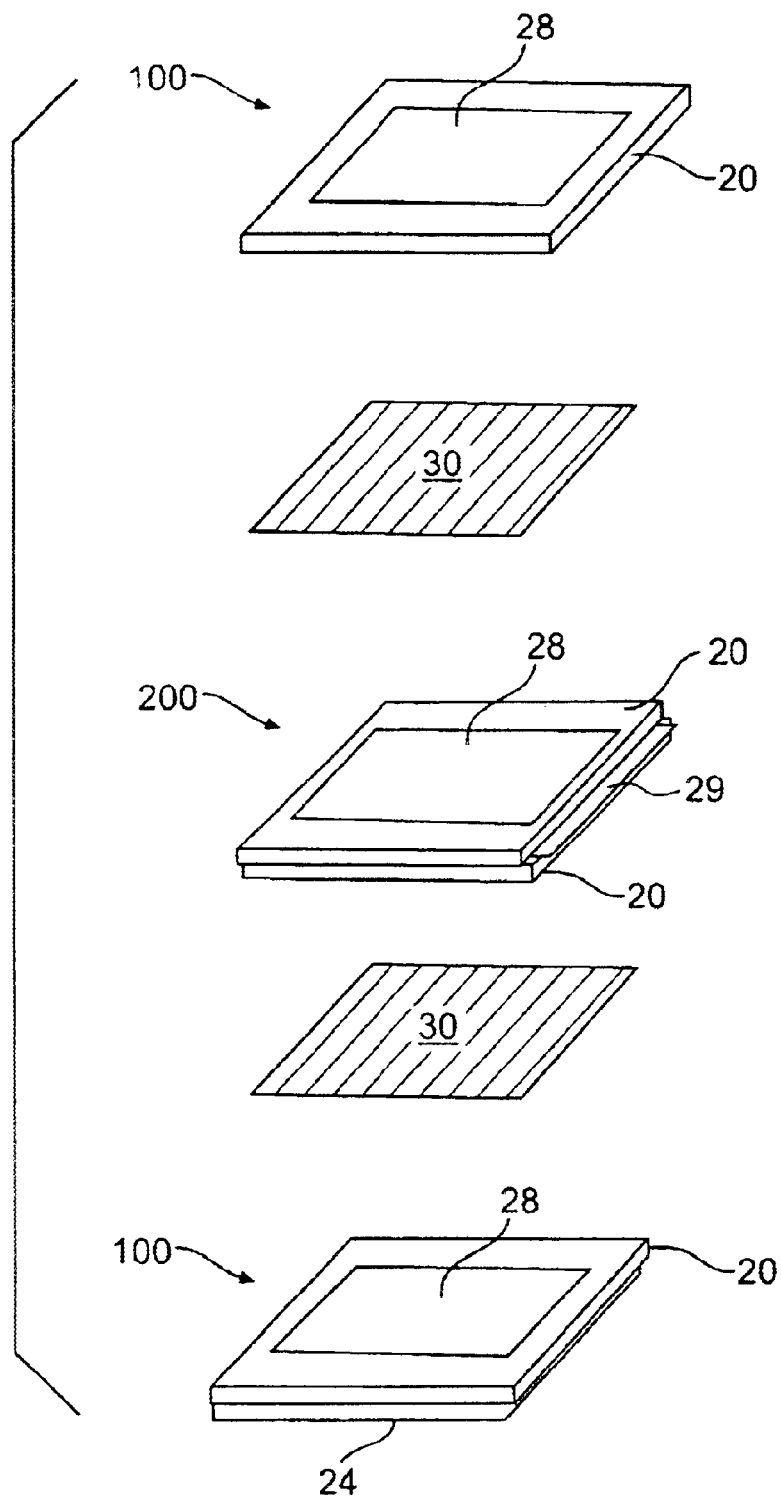
FIG. 2 is an exploded isometric view of one exemplary embodiment of a stack made in accordance with the present invention.

As shown in FIG. 2, a bi-polar assembly 200 can be formed by attaching two perforated isolating frames 20 to both sides of a single conductive polymer bi-polar current collector 29. On the top and bottom sides of the bi-polar assembly 200, the same carbon-based electrode paste 26 may be placed within the openings 22 to form electrode plates 28, similar to the electrode plates of the single pole assembly 100 as displayed in FIG. 1.

In one exemplary preferred embodiment an electrochemical multi-celled capacitor may be formed, as shown in FIG. 2, by utilizing two assemblies (as shown in FIG. 1) and a bi-polar assembly 200 with their respective electrode plates 28 by stacking the assemblies 100, 200 and 100, and separating them with proton conductive polymer membranes 30. The membranes 30 function as a proton conductive layer between electrode plates 28. The multi-celled capacitor may then be connected to a current collector 24 as described above.

Figure 3A:
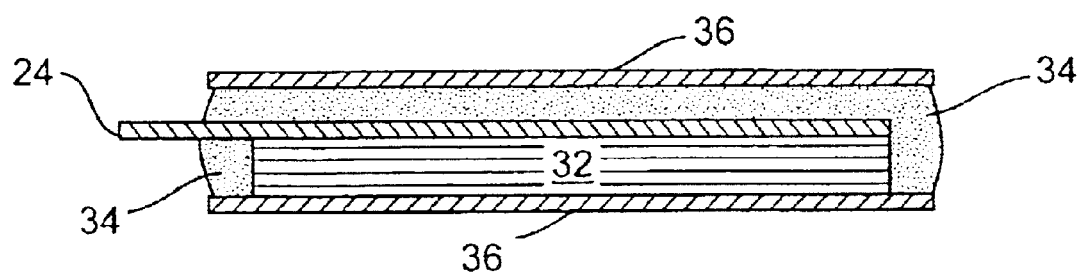
FIG. 3A is a cross-sectional view of an exemplary embodiment of a series connection among the cells of the internal stack in accord with the present invention.
Figure 3B:
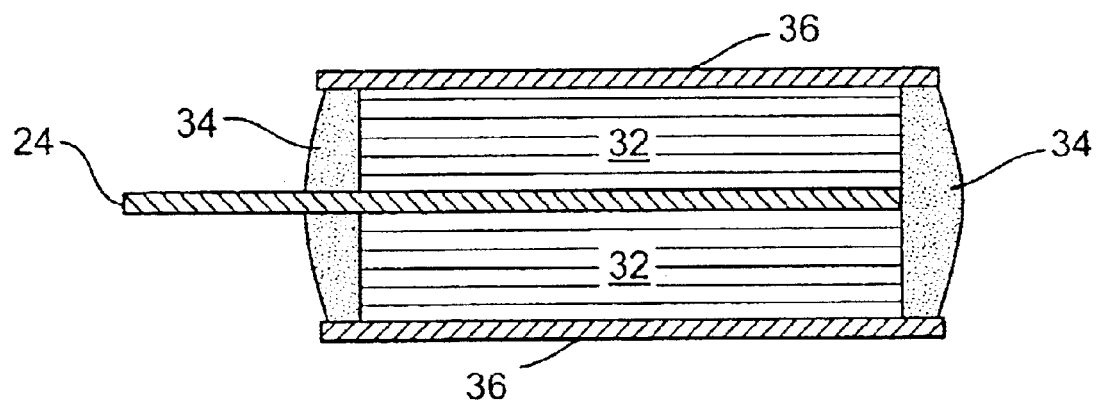
FIG. 3B is a cross-sectional view of the exemplary embodiment of FIG. 2 showing a parallel connection of two bi-polar internal stacks with tongue in accord with the present invention.

The entirety of the internal stack 32, as shown in FIG. 3A and 3B, except for the side opposing the current collector 24 may then be potted or coated in a non-conductive material 34, including, but not limited to an epoxy material. The outer casing 36 may then be formed on both sides of the existing stack 32 and be placed in electrical connection with the non-epoxy coated side of the stack 32. (The method of preparing and forming the outer casing will be discussed in detail below.) Such a device can be seen in FIG. 3A.

FIG. 3B depicts a similar electrochemical device. In this alternative exemplary embodiment, there are two internal stacks 32 jointly connected to a current collector (a.k.a. a tongue) 24 in parallel. In this preferred embodiment, the internal stacks 32 (separated only by the current collector 24) may be coated only on their ends with the non-conductive epoxy 34. This leaves a point of connection for each stack 32 with the outer casing 36. Such a device enhances the capacity and reduces the ESR of the device.

The present invention is characterized by a bi-polar stack of a plurality of cells. The stack is potted with a sealing material, such as, but not limited to an epoxy, on its four peripheral edges. A pre-formed metal casing covers two opposing peripheral edges of the potted stack while maintaining good electrical contact with the terminal current collectors. The terminal collectors being located on the non-potted opposing faces of the stack. This provides the advantages of smaller volumes, more versatile electrical connections, ease of changing the size and number of cells in an assembly without expensive re-tooling, and the possibility to make hybrid systems of a battery or batteries and a capacitor or capacitors in one package.

The outer casing 36 of the present invention, regardless of shape or style, are pressed into continuous contact with the internal stack 32. Similarly, the preferable material for the outer casing 36 is a pre-formed metal sheet, including, but not limited to stainless steel. A pre-formed metal sheet is desirable to enhance the conductivity of the outer casing 36. Stainless steel is a preferred material due to its stability characteristics. Unfortunately, stainless steel generally has a layer of oxidation which needs to be removed. To aid in reducing such a stainless steel outer casing's resistance, once the oxidation layer has been removed from the surface of the casing 36, it is coated with a highly conductive material such as but not limited to gold, nickel, platinum, silver, lead, tin, or brass. The material may be attached in any of the known methods of coating a substrate with a metal including but not limited to sputtering or electro-or electroless plating.

When the internal stack 32 is housed in the outer casing 36 and such is pressed into contact with the internal stack 32 with sufficient force, the result is a flexible energy storage device which is small in size, easily adjusted to suit the thickness of the internal stack 32 and exhibits a low ESR, high capacity/voltage, and is extremely cost effective to manufacture. Additionally, such a flexible design allows for the use of the same pressure levels to generate differing size devices with identical performance characteristics.

Figure 4A:
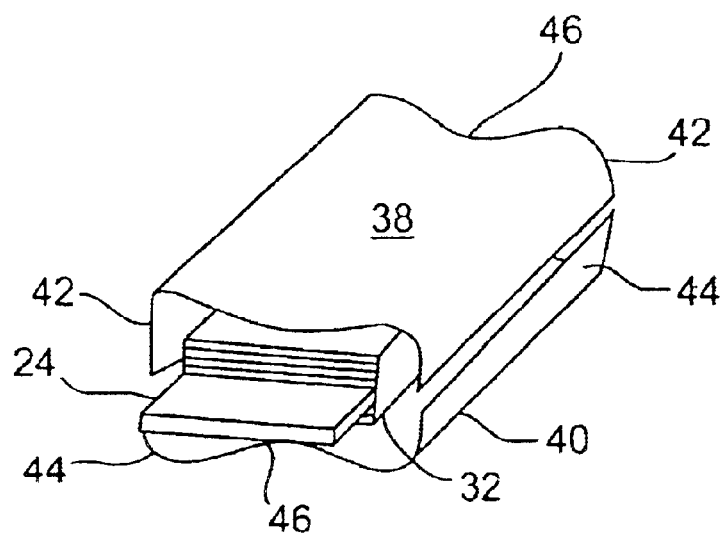
FIG. 4A is an isometric view of one exemplary embodiment of an outer casing comprising two pre-loaded U-shaped shells in accord with the present invention.
Figure 4B:
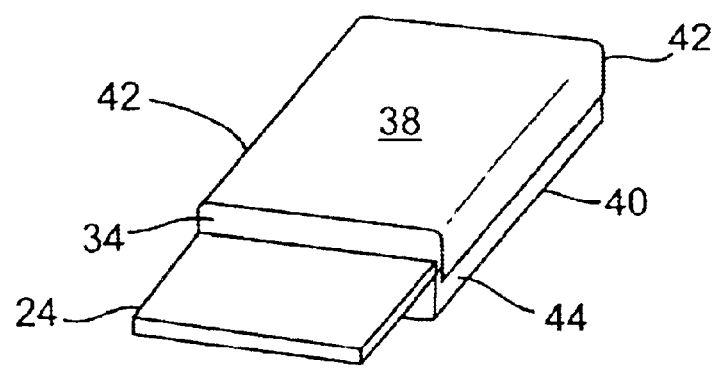
FIG. 4B is an isometric view of the outer casing of the exemplary embodiment in FIG. 4A after final assembly of the device.

FIGS. 4A and 4B depict one exemplary such outer casing 36 which comprises two U-shaped shells 38 and 40 before and after completion of the manufacture of the device. Each shell includes side portions 42 and 44 extending around the internal stack 32. The side portions 42 and 44 may be allowed to overlap along the side of the internal stack 32 so as to encase the same. The side portions 42 and 44 are then joined together along the overlap in order to complete the outer casing 36.

As shown in FIG. 4A, the U-shaped shells 38 and 40 may be bowed 46 slightly so as to incorporate a spring-like load into the shells. Once affixed around the internal stack 32, such a spring-like loading may allow the outer casing 36 to cope with thermal expansion cycling of the device during its operation.

Figure 5A:
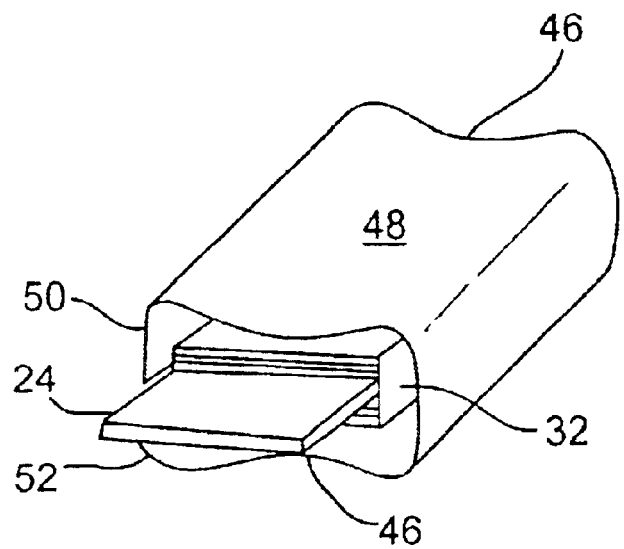
FIG. 5A is an isometric view of an alternative exemplary embodiment of an outer casing comprising a single sheet in accord with the present invention.
Figure 5B:
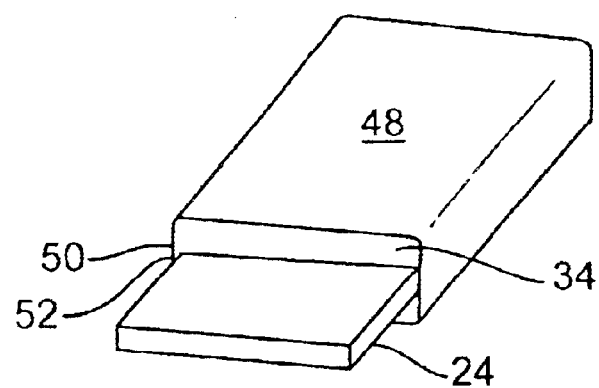
FIG. 5B is an isometric view of the outer casing of the exemplary embodiment in FIG. 5A after final assembly of the device.

Similarly, FIGS. 5A and 5B depict an alternative exemplary outer casing 36. In this exemplary embodiment, the outer casing 36 comprises a single sheet 48 of the pre-formed metal sheet with end portions 50 and 52. As in the previous embodiment, end portions 50 and 52 may be allowed to overlap each other when fitted around the internal stack 32. The end portions 50 and 52 are then joined along the length of the overlap to complete the construction of the device. Also as before, the outer casing 36 may be bowed 46 in order to incorporate the spring-like loading to counter thermal expansion cycling.

Figure 6:
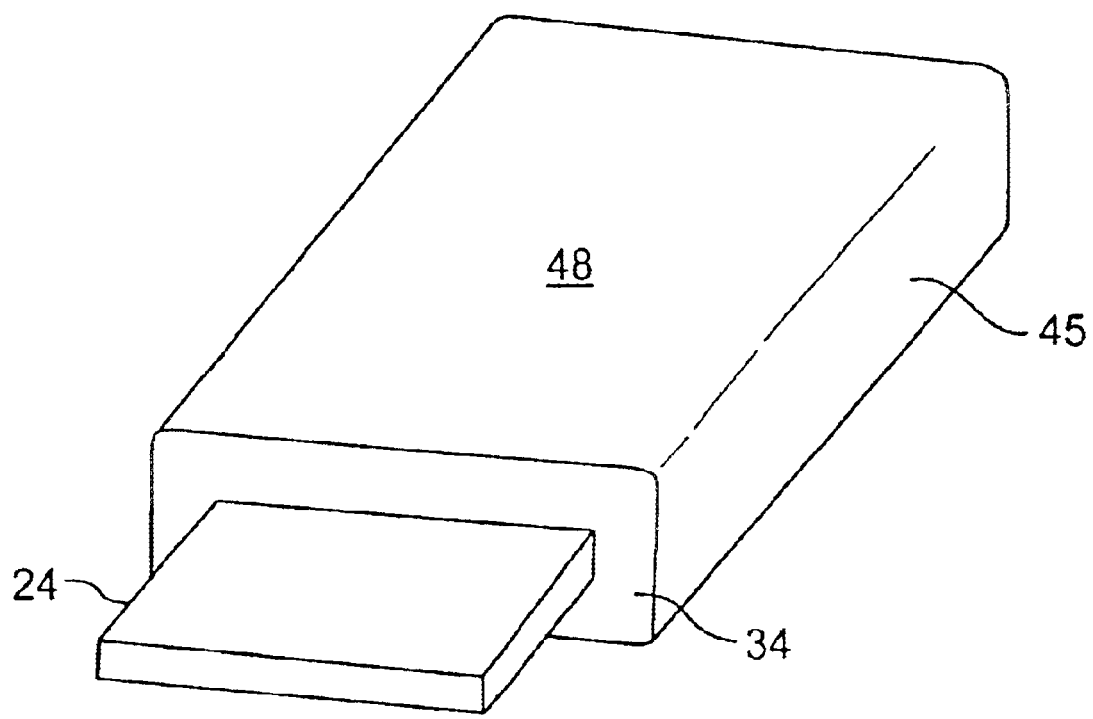
FIG. 6 is an isometric view of an alternative exemplary embodiment of an outer casing comprising a tube in accord with the present invention and after final assembly of the device.

As depicted in FIG. 6, a third exemplary embodiment of the outer casing 36 may be comprised of a seamless pre-formed metal tube structure 45. Similar to the preceding two exemplary embodiments, the multi-shell casing and the single sheet casing, the seamless pre-formed metal tube structure 45 encase the internal stack 32 and may incorporate a spring loading to offset the effects of thermal expansion.

FIG. 7 provides a table comparing various capacitors technologies with that made in accordance with the present invention and showing the variability of the physical characteristics and performance level of the present invention. Similarly, FIG. 8 provides a table comparing physical and performance characteristics of various electrochemical devices made in accord with the present invention.

Although a preferred embodiment of the invention has been described using specific terms and devices, such description is for illustrative purposes only. The words used are words of description rather than of limitation. It is to be understood that changes and variations may be made by those of ordinary skill in the art without departing from the spirit or scope of the present invention, which is set forth in the following claims. In addition, it should be understood that aspects of various other embodiments may be interchanged both in whole or in part. Therefore, the spirit and scope of the appended claims should not be limited to the description of the preferred version contained herein.

What is claimed is:

1. An electrochemical energy storage device, comprising:
   a plurality of cells in series, said plurality of cells being electrically connected via a plurality of bi-polar current collectors and wherein said plurality of cells and said plurality of bi-polar current collectors are stacked to form an assembly; and
   a pre-formed metal sheet outer casing electrically connected to said assembly and serving as an external electrical contact;
   wherein said pre-formed metal sheet outer casing comprises two shells, each shell including side portions opposing each other to form an open-ended outer covering for said assembly, and wherein said side portions overlap each other and are joined together.

2. An electrochemical energy storage device as in claim 1, wherein said shells are U-shaped and form a box-shaped outer casing.

3. An electrochemical energy storage device as in claim 1, wherein said outer casing is joined at each of said overlapping side portions by welding.

4. An electrochemical energy storage device as in claim 1, wherein staid pre-formed metal sheet is stainless steel.

5. An electrochemical energy storage device as in claim 4, wherein said outer casing is cleaned of any oxidation products and coated with a highly conductive metal.

6. An electrochemical energy storage device as in claim 5, wherein said highly conductive metal is gold.

7. An electrochemical energy storage device as in claim 1, wherein said outer casing is partially bowed to impart a spring loading thereto.

8. An electrochemical energy storage device, comprising:
   a plurality of cells in series, said plurality of cells being electrically connected via a plurality of bi-polar current collectors and wherein said plurality of cells and said plurality of bi-polar current collectors are stacked to form an assembly; and
   a pre-formed metal sheet outer casing electrically connected to said assembly and serving as an external electrical contact;
   wherein said pre-formed metal sheet outer casing is a single sheet folded at least once approximate its midpoint and at least once at each end to form side portions, and wherein said side portions oppose each other to form an open-ended ended outer covering for said assembly, and wherein said side portions overlap each other and are joined together.

9. An electrochemical energy storage device as in claim 8, wherein said outer casing is joined at each of said overlapping side portions by welding.

10. An electrochemical energy storage device as in claim 8, wherein said pre-formed metal sheet is stainless steel.

11. An electrochemical energy storage device as in claim 10, wherein said outer casing is cleaned of any oxidation products and coated with a highly conductive metal.

12. An electrochemical energy storage device as in claim 11, wherein said highly conductive metal is gold.

13. An electrochemical energy storage device as in claim 8, wherein said outer casing is partially bowed to impart a spring loading thereto.

14. An electrochemical energy storage device comprising:
a plurality of cells in series, said plurality of cells being electrically connected via a plurality of bi-polar current collectors and wherein said plurality of cells, said plurality of bi-polar current collectors and at least one terminal current collector are stacked to form a stacked assembly, said at least one terminal current collector extending laterally from said stacked assembly and providing a first external electrical contact; and
a pre-formed metal sheet outer casing electrically connected to said stacked assembly and serving as a second external electrical contact, wherein said pre-formed metal sheet outer casing is a tube.

15. An electrochemical energy storage device as in claim 14, wherein said pre-formed metal sheet is stainless steel.

16. An electrochemical energy storage device as in claim 15, wherein said outer casing is cleaned of any oxidation products and coated with a highly conductive metal.

17. An electrochemical energy storage device as in claim 16, wherein said highly conductive metal is gold.

18. An electrochemical energy storage device as in claim 14, wherein said outer casing is partially bowed to impart a spring loading thereto.

19. A method of forming an electrochemical energy storage device, comprising:
providing a plurality of cells in series, said plurality of cells being electrically connected via a plurality of current collectors;
stacking said plurality of current collector connected cells to form an assembly; and
providing a pre-formed metal sheet outer casing for said assembly and electrically connected to said assembly, and wherein said outer casing serves as an external electrical contact;
wherein said pre-formed metal sheet outer casing comprises two shells, each shell including side portions opposing each other to form an open-ended outer covering for said assembly, and wherein said side portions overlap each other and are joined together.

20. A method of forming an electrochemical energy storage device as in claim 19, wherein said shells are U-shaped and form a box-shaped outer casing.

21. A method of forming an electrochemical energy storage device as in claim 19, wherein said outer casing is joined at each of said overlapping side portions by welding.

22. A method of forming an electrochemical energy storage device as in claim 19, wherein said pre-formed metal sheet is stainless steel.

23. A method of forming an electrochemical energy storage device as in claim 22, wherein said outer casing is cleaned of any oxidation products and coated with a highly conductive metal.

24. A method of forming an electrochemical energy storage device as in claim 23, wherein said highly conductive metal is gold.

25. A method of forming an electrochemical energy storage device as in claim 19, wherein said outer casing is partially bowed to impart a spring loading thereto.

26. A method of forming an electrochemical energy storage device, comprising:
providing a plurality of cells in series, said plurality of cells being electrically connected via a plurality of current collectors;
stacking said plurality of current collector connected cells to form an assembly; and
providing a pre-formed metal sheet outer casing for said assembly and electrically connected to said assembly, and wherein said outer casing serves as an external electrical contact;
wherein said pre-formed metal sheet outer casing is a single sheet folded at least once approximate its midpoint and at least once at each end to form side portions, and wherein said side portions oppose each other to form an open-ended outer covering for said assembly, and wherein said side portions overlap each other and are joined together.

27. A method of forming an electrochemical energy storage device as in claim 26, wherein said outer casing is joined at each of said overlapping side portions by welding.

28. A method of forming an electrochemical energy storage device as in claim 26, wherein said pre-formed metal sheet is stainless steel.

29. A method of forming an electrochemical energy storage device as in claim 28, wherein said outer casing is cleaned of any oxidation products and coated with a highly conductive metal.

30. A method of forming an electrochemical energy storage device as in claim 29, wherein said highly conductive metal is gold.

31. A method of forming an electrochemical energy storage device as in claim 26, wherein said outer casing is partially bowed to impart a spring loading thereto.

32. A method of forming an electrochemical energy storage device comprising the steps of:
providing a plurality of cells and a plurality of current collectors, wherein said plurality of current collectors includes at least one bi-polar current collector and at least one terminal current collector;
stacking said plurality of cells and said plurality of current collectors to form a stacked assembly, wherein said at least one bi-polar current collector connects adjacent of said plurality of cells and wherein said at least one terminal current collector extends laterally from said stacked assembly and provides a first external electrical contact; and
providing a pre-formed metal sheet outer casino for said assembly and electrically connected to said stacked assembly, and wherein said outer casing serves as a second external electrical contact, and wherein said pre-formed metal sheet outer casing is a tube.

33. A method of forming an electrochemical energy storage device as in claim 32, wherein said pre-formed metal sheet is stainless steel.

34. A method of forming an electrochemical energy storage device as in claim 33, wherein said outer casing is cleaned of any oxidation products and coated with a highly conductive metal.

35. A method of forming an electrochemical energy storage device as in claim 34, wherein said highly conductive metal is gold.

36. A method of forming an electrochemical energy storage device as in claim 32, wherein said outer casing is partially bowed to impart a spring loading thereto.

* * * * *

UNITED STATES PATENT AND TRADEMARK OFFICE
CERTIFICATE OF CORRECTION

PATENT NO. : 6,790,556 B1
DATED : September 14, 2004
INVENTOR(S) : Arieh Meitav et al.

It is certified that error appears in the above-identified patent and that said Letters Patent is hereby corrected as shown below:

Column 8,
Line 40, please change "staid" to -- said --.

Column 10,
Line 48, please change "casino" to -- casing --.

Signed and Sealed this

Thirtieth Day of November, 2004

JON W. DUDAS
*Director of the United States Patent and Trademark Office*